United States Patent
Malladi et al.

(10) Patent No.: US 10,045,320 B2
(45) Date of Patent: Aug. 7, 2018

(54) HANDOVER IN WIRELESS COMMUNICATIONS

(71) Applicant: QUALCOMM Incorporated, San Diego, CA (US)

(72) Inventors: Durga Prasad Malladi, San Diego, CA (US); Aleksandar Damnjanovic, Del Mar, CA (US); Etienne F Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/376,454

(22) Filed: Dec. 12, 2016

(65) Prior Publication Data
US 2017/0094627 A1  Mar. 30, 2017

Related U.S. Application Data

(63) Continuation of application No. 12/048,913, filed on Mar. 14, 2008, now abandoned.
(Continued)

(51) Int. Cl.
*H04L 1/00* (2006.01)
*H04W 56/00* (2009.01)
(Continued)

(52) U.S. Cl.
CPC ....... *H04W 56/0045* (2013.01); *H04L 5/0048* (2013.01); *H04W 36/08* (2013.01); *H04W 72/1284* (2013.01)

(58) Field of Classification Search
CPC ..... H04B 7/2615; H04B 7/18541; H04J 4/00; H04L 5/26; H04L 47/767; H04L 1/0002;
(Continued)

(56) References Cited

U.S. PATENT DOCUMENTS

| 5,722,072 A | 2/1998 | Crichton et al. |
| 5,905,950 A | 5/1999 | Anell |

(Continued)

FOREIGN PATENT DOCUMENTS

| JP | 6509928 A | 11/1994 |
| KR | 20050057075 A | 6/2005 |

(Continued)

OTHER PUBLICATIONS

"3GPP TR 25.814 V7.1.0, Technical Report, 3rd Generation Partnership Project; Technical Specification Group Radio Access Network; Physical layer aspects for evolved Universal Terrestrial Radio Access (UTRA) (Release 7)" Sep. 1, 2006 (Sep. 1, 2006), XP002511692 Retrieved from the Internet: URL:http://www.3gpp.org/ftp/Specs/archive/25_series/25.814/25814-710.zip>; [retrieved on Jan. 22, 2009].

(Continued)

*Primary Examiner* — Dady Chery
(74) *Attorney, Agent, or Firm* — Patterson & Sheridan LLP

(57) ABSTRACT

Systems and methodologies are described that facilitate handing over mobile device communications in a wireless network from a source base station to a target base station without using a random access channel (RACH). In this regard, the mobile device can monitor multiple base stations determining timing information related thereto and access scheduling request channels for the base stations. When ready for handover, the mobile device can request data resources over the scheduling request channel using the appropriate timing information.

19 Claims, 10 Drawing Sheets

Related U.S. Application Data

(60) Provisional application No. 60/895,449, filed on Mar. 17, 2007.

(51) Int. Cl.
*H04W 36/08* (2009.01)
*H04W 72/12* (2009.01)
*H04L 5/00* (2006.01)

(58) Field of Classification Search
CPC .... H04L 1/20; H04W 36/00; H04W 36/0005; H04W 36/0016; H04W 36/0083; H04W 36/0088; H04W 36/0094; H04W 28/0257; H04W 28/04
USPC ........ 370/330, 331, 332, 333; 455/436, 438, 455/432.2, 435.1, 437
See application file for complete search history.

(56) References Cited

U.S. PATENT DOCUMENTS

| | | |
|---|---|---|
| 2007/0002724 A1 | 1/2007 | Khan |
| 2007/0047493 A1 | 3/2007 | Park et al. |
| 2007/0149206 A1 | 6/2007 | Wang et al. |
| 2008/0043672 A1 | 2/2008 | Sebire et al. |
| 2008/0225796 A1 | 9/2008 | Malladi et al. |
| 2010/0157885 A1 | 6/2010 | Koyanagi et al. |

FOREIGN PATENT DOCUMENTS

| | | |
|---|---|---|
| RU | 2145774 C1 | 2/2000 |
| RU | 2270526 C2 | 2/2006 |
| WO | WO-0135586 A1 | 5/2001 |
| WO | WO-2004006515 A1 | 1/2004 |
| WO | WO-2006062445 | 6/2006 |
| WO | WO-2007023786 A1 | 3/2007 |
| WO | WO-2007075559 A2 | 7/2007 |

OTHER PUBLICATIONS

3GPP TR 25.912 v0.2.0 Technical Report : "Technical Specification Group Radio Access Network; Feasibility Study for Evolved UTRA and UTRAN (Release 7)" 3rd Generation Partnership Project (3GPP); (Jun. 1, 2006), pp. 1-57, XP002455821.

Alcatel, "Access Alternatives for Handover", R2-062267, 3GPP, pp. 1-4, Sep. 1, 2006.

Alcatel, "Access Alternatives for Handover", R2-062785, 3GPP, pp. 1-5, Oct. 13, 2006.

Alcatel, "Access Alternatives for Handover", R2-063329, 3GPP, pp. 1-5, Nov. 10, 2006.

International Search Report and Written Opinion—PCT/US2008/057288, International Search Authority—European Patent Office—Nov. 27, 2008.

IP Wireless: "Contention-free Intra-LTE handover", 3GPP Draft; R2-070646, 3rd Generation Partnership Project (3GPP), Mobile ,. Competence Centre ; 650, Route Des Lucioles ; F-06921 Sophia-Antipolis Cedex ; France, vol . TSG RAN WG2 RL2TSGR2 57 Documents, no. St. Louis, USA; Feb. 12, 2007, Feb. 7, 2007 (Feb. 7, 2007), XP050133690.

NTT DoCoMo, Fujitsu, Mitsubishi Electric, NEC, Sharp, Toshiba Corporation,Physical Channels for Scheduling Request and Timing Synchronization in E-UTRA Uplink, 3GPP TSG RAN WG1 LTE Ad Hoc, R1-061661, Jun. 27, 2006, All pages, All figs.

Siemens, "Uplink Extended Cyclic Prefix Use Cases", R1-070306, 3GPP, pp. 1-3, Jan. 19, 2007.

Texas Instruments, "Preamble-Based Scheduling Request: Comparison with Other Solutions", R1-070718, 3GPP, pp. 1-8, Feb. 12, 2007.

HANDOVER IN WIRELESS COMMUNICATIONS

CROSS-REFERENCE TO RELATED APPLICATIONS

This application is a continuation of U.S. patent application Ser. No. 12/048,913, entitled "Handover in Wireless Communications" and filed Mar. 14, 2008, which claims the benefit of U.S. Provisional Patent Application Ser. No. 60/895,449 entitled "OPTIMIZED FORWARD HANDOVER PROCEDURE FOR LTE" which was filed Mar. 17, 2007, both of which are assigned to the assignee hereof and are herein incorporated by reference in their entirety.

BACKGROUND

I. Field

The following description relates generally to wireless communications, and more particularly to handover in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. As mobile devices move throughout service areas, communication for the devices can be handed over between one or more base stations. For example, where an available base station can offer a better signal or service than a base station currently communicating with the mobile device, the device can be handed over to the available base station. This is typically accomplished by using a random access channel (RACH) to request and schedule resources; however, the RACH can become over-utilized in active communications networks.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating handing-over communications in a wireless communications network at least in part by requesting or otherwise obtaining information from one or more target access points, such as a scheduling request channel, cell radio network temporary identifier (C-RNTI), channel quality indicator (CQI) resources, and/or the like. Using the resources, an access terminal can find a desirable access point for handing-over communications and perform the handover when advantageous to do so. Additionally, the access terminal can receive indication of a timing advance (TA) or other synchronization information regarding the access points to allow the access terminal to handover without using a random access channel (RACH).

According to related aspects, a method for handing over communications in a wireless network is provided. The method can include receiving wireless communications service from a source base station and receiving multiple assigned uplink control channels for transmitting schedule request signals to a plurality of target base stations. The method can further include transmitting a scheduling request to a selected target base station of the plurality of target base stations over at least one of the assigned uplink control channels.

Another aspect relates to a wireless communications apparatus. The wireless communications apparatus can include at least one processor configured to monitor timing of a plurality of base stations and select a target base station in the plurality of base stations for handover of communications based at least in part on the monitored timing. The wireless communications apparatus can also include a memory coupled to the at least one processor.

Yet another aspect relates to a wireless communications apparatus for handing over communications in a wireless network. The wireless communications apparatus can include means for receiving wireless communications service from a source base station and means for receiving multiple assigned uplink control channels for transmitting schedule request signals to a plurality of target base stations. The wireless communications apparatus can additionally include means for transmitting a scheduling request to a selected target base station of the plurality of target base stations over at least one of the assigned uplink control channels.

Still another aspect relates to a computer program product, which can have a computer-readable medium including code for causing at least one computer to receive wireless communications service from a source base station. The computer-readable medium can further comprise code for causing the at least one computer to receive multiple assigned uplink control channels for transmitting schedule request signals to a plurality of target base stations. Moreover, the computer-readable medium can include code for causing the at least one computer to scheduling request to a selected target base station of the plurality of target base stations over at least one of the assigned uplink control channels.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
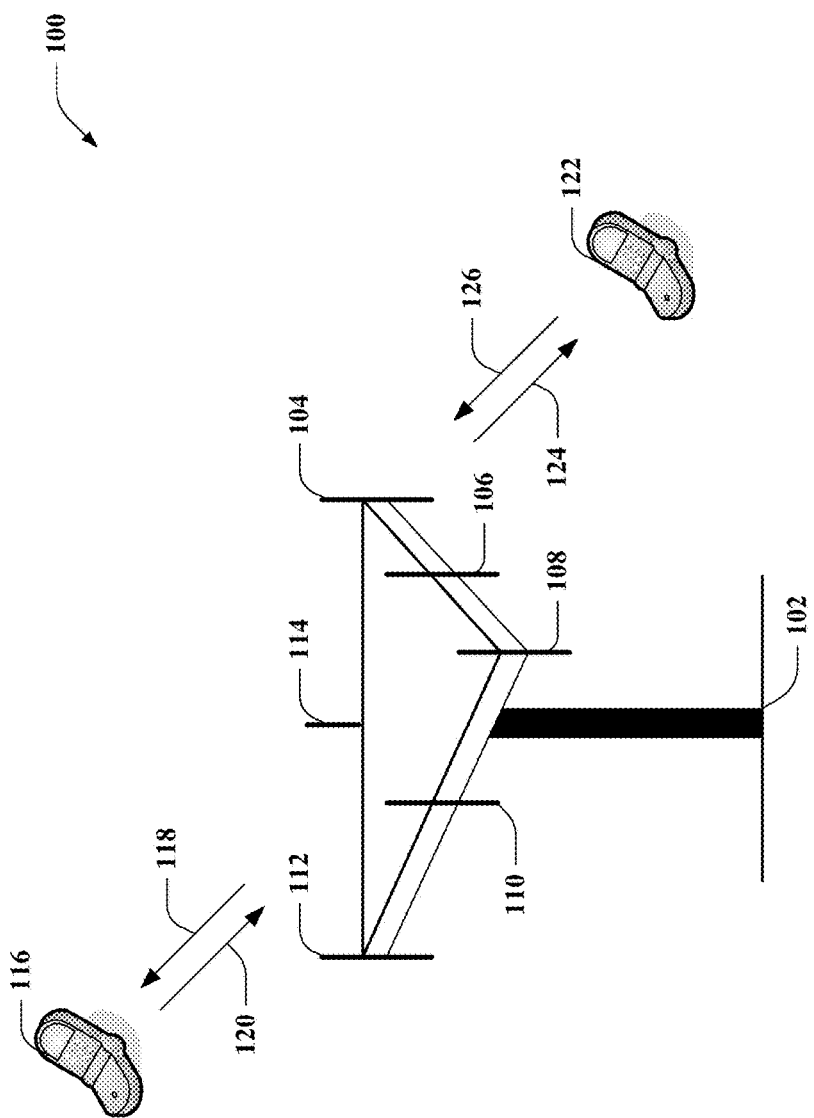
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplex-ing technique to divide communication channels (e.g., forward link, reverse link, . . . ) such as FDD, TDD, and the like. The communication channels can comprise one or more logical channels. Such logical channels can be provided for transmitting different types of data between the mobile devices 116 and 122 and the base station 102 (or from mobile device 116 to mobile device 122 in a peer-to-peer configuration, for example). Such channels can exist for transmitting control data, regular shared data (e.g., communication data), random access data, beacon/pilot data, broadcast data, and/or the like. For example, the base station 102 can establish a shared data channel utilized by the mobile devices 116 and 122 to access resources of the base station; additionally, the base station 102 can have a dedicated control channel for transmitting control information related to the shared data channel, for example.

Communications over the channels can be orthogonal (e.g., using OFDM, SC-FDM, and/or the like) such that mobile devices 116 and 122 transmit at different times on a given channel to prevent collision; to facilitate orthogonal communicating, the mobile devices 116 and 122 can be given a timing advance (TA) with respect to transmitting over the channels. The timing advance can specify a waiting period before the given mobile device can communicate or the period during which the device is to communicate on the channel, etc. Additionally, data can be communicated with a cyclic prefix adjusting for error in timing of transmitting the data. For example, the cyclic prefix can be a portion of one or more symbols transmitted on a channel that can be re-transmitted at the beginning or end of the symbol transmission in the event that a portion of the symbol is not received due to the timing error. For given channels, the cyclic prefix can vary to tolerate additional timing error (this can depend on the type, demand, and/or method of connection for the channel, for example). In one example, a channel utilized to acquire channel resources from a new device can have a larger cyclic prefix since the timing of the channel is not certain to the device. In prior systems, the random access channel (RACH) can have a larger cyclic prefix to allow devices to send connection or handover requests, for example.

In one example, the subject matter described herein can handover devices from one base station to another by allowing the device being handed over to obtain data resources from the target base station prior to initiating the handover. In one example, this can be facilitated by requesting semi-static information from target base station(s), such as a TA, cell radio network temporary identifier (C-RNTI), channel quality indicator (CQI) information, and the like by transmitting a sounding reference signal (SRS) and/or the like to monitor resources on the target base station(s). Using this information, the device can determine timing information, such as a timing advance utilized by the target base station(s), for handing-over communications to the target base station(s). Once the device moves within sufficient range of at least one of the target base station(s), the device can request data resources from the at least one target base station over a scheduling request channel using the timing adjustment. Subsequently, communications can be handed over upon receiving the data resources. To the extent there is timing error associated with the data resource request, strategically utilizing transmit time intervals (TTI) with longer cyclic prefixes (CP) than other TTIs can help account for the error in one example. Alternatively, in one example, substantially all CP can be sufficiently long to account for timing error.

Figure 2:
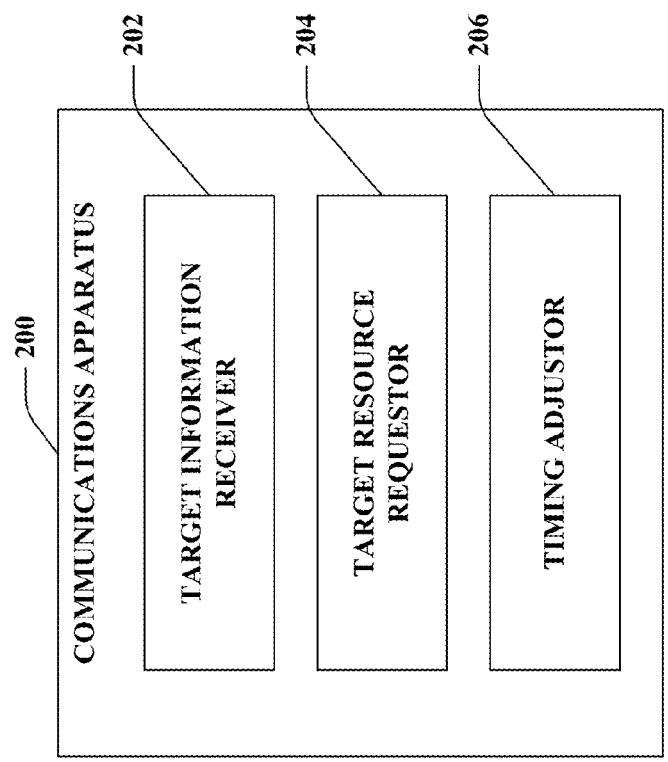
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a target information receiver 202 that can acquire data regarding disparate communications apparatuses, a target resource requestor 204 that can request resources from a target communications apparatus to handover communication from a disparate device, and a timing adjustor 206 that can correct timing for communicating with the target communications apparatus.

According to an example, the target information receiver 202 can receive requested data regarding one or more disparate communications apparatuses (not shown). For example, the communications apparatus 200 can be a mobile device and the disparate communications apparatuses can provide data access to the mobile device such that the device can be handed over between the disparate communications apparatuses. The handing over can be based at least in part on signal quality, services offered by the apparatuses, and/or the like, for example. The received information can be related to semi-static information regarding the disparate communications apparatuses, such as a TA, C-RNTI, CQI information, etc. and can be received in response to transmitting an SRS to the apparatuses. The communications apparatus 200 can determine a better suited communications apparatus for handing-over communications based at least in part on the information. It is to be appreciated that the communications apparatus 200 can maintain and monitor this information with respect to the candidate target communications apparatuses. In one example, the information can be received over a downlink control or data channel from the target communications apparatuses or through the source communications apparatus. In addition, schedule request channels for the target communications apparatuses can be assigned to the communications apparatus 200 by the target communications apparatuses over the air or through the source communication apparatus (e.g., via backhaul link).

Handover of the communications for the communications apparatus 200 can occur, in one example, where the signal strength of a target communication apparatus exceeds or is sufficiently close to that of a source communications apparatus (not shown) to which the communications apparatus 200 is currently communicating. When the determination for handing over is made, the communications apparatus 200 can detect one or more of the target communications apparatuses having a substantially similar (or a most similar) TA as the source communications apparatus using the information received (as described above) and can utilize the target resources requestor 204 to directly request uplink (UL) resources on the UL schedule request channel of the target communications apparatus using the known TA. In this regard, a RACH can be avoided as the communications apparatus 200 knows the TA from received information.

Subsequently, the timing adjustor 206 can be utilized to make minor adjustments to the timing utilized by the communications apparatus 200 in communicating with the target communications apparatus where necessary. In one example, as mentioned, the communications apparatus 200 can strategically choose to handover communications to the target communications apparatus in a TTI where a longer CP can be utilized. For example, the target communications apparatus can offer such TTIs periodically, according to a pattern, based on desired handover, and/or the like. The longer CP can account for initial error; upon receiving a subsequent communication from the target communications apparatus, the timing adjustor 206 can synchronize timing with the target communications apparatus. It is to be appreciated that additional or alternative mechanisms can be used to account for error in communication. For example, the communications apparatus 200 can use a hybrid automatic repeat-request (HARQ) communication for initially handing over. It is to be appreciated that these techniques can be most useful where TA is determined based at least in part on downlink timing difference in an asynchronous wireless communications network.

In another example, the communications apparatus 200 can transmit reference signals to the target communications apparatus to initially receive information related thereto by the target information receiver 202. In this regard, the communications apparatus 200 (or a component thereof which is not shown) can request communication gaps from the source communications apparatus where the source communications apparatus can expect not to receive communications from the communications apparatus 200. During these gaps, the communications apparatus 200 can send references signals and/or receive resources from the target communications apparatus that can subsequently be used in handover as described above.

Figure 3:
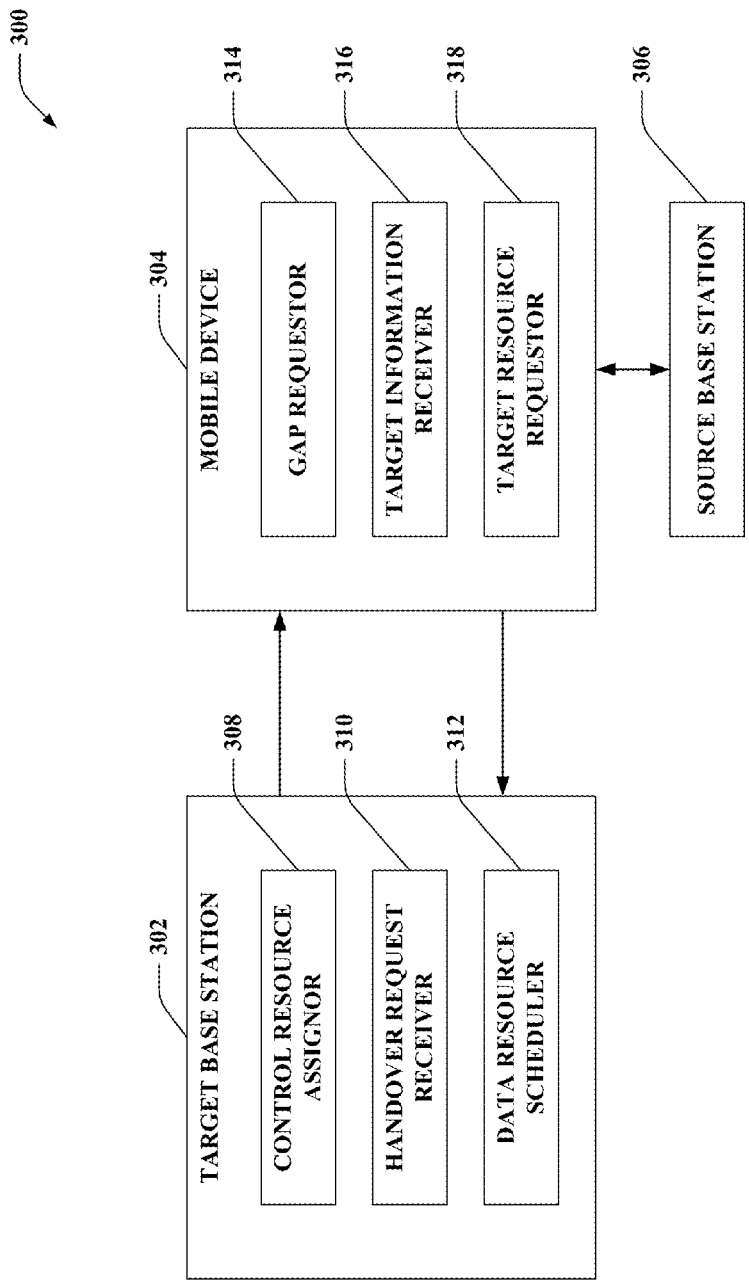
FIG. 3 is an illustration of an example wireless communications system that effectuates handing over communications using target resources.

Now referring to FIG. 3, illustrated is a wireless communications system 300 that can utilize target base station resources for synchronizing data resources in mobile device handover. The system 300 includes a target base station 302 that can communicate with a mobile device 304 (and/or any number of disparate mobile devices (not shown)) to facilitate handing-over wireless communication service. The mobile device 304 can also be communicating with a source base station 306 for current wireless communication service. Base stations 302 and 306 can transmit information to mobile device 304 over a forward link channel; further base stations 302 and 306 can receive information from mobile device 304 over a reverse link or uplink channel. In addition, the mobile device 304 can desire to handover communications to the target base station 302 from the source base station 306 at a particular point in time. Moreover, system 300 can be a MIMO system. Additionally, the system 300 can operate in an OFDMA or SC-FDMA wireless network (such as 3GPP, 3GPP LTE, and the like, for example). Also, the components and functionalities shown and described below in the base stations 302 and 306 can be present each other and/or in the mobile device 304 as well and vice versa, in one example; the configuration depicted excludes these components for ease of explanation.

Target base station 302 includes a control resource assignor 308 that can provide control resources to one or more mobile devices seeking communication handover, a handover request receiver 310 that can obtain a request for handing over communications from the one or more mobile devices, and a data resource scheduler 312 that can provide data channel access to the one or more mobile devices to complete the handover procedure. For example, a mobile device, such as mobile device 304 can request control resources or timing information, such as by transmitting an SRS and/or the like, for maintaining timing of the target base station 302, and the control resource assignor 308 can assign scheduling request resources for the target base station 302 to the mobile device 304. The device can desire handover, and the handover request receiver 310 can receive the request for handing-over communications. In one example (e.g., an asynchronous wireless network detecting timing difference from downlink channels), the request can be sent without completely accurate timing and measures can be used to account for the error as described previously (e.g., longer CP TTIs, HARQ transmissions, etc.). The data resource scheduler 312 can schedule and provide data communications channels to the device for completing handover of the wireless communications without using a RACH.

Mobile device 304 includes a gap requestor 314 that can provide a base station with time intervals over which the mobile device 304 will not be transmitting communication to the base station and a target information receiver 316 that can request/receive information related to a target base station, which can include semi-static information utilized to monitor timing of the base station. The mobile device can also include a target resource requestor 318 that can request handover with the target base station when an optimal handover time is determined. Moreover, the mobile device 304 can be connected to a source base station 306 to facilitate wireless communication services.

According to an example, the mobile device 304 can be moving throughout a sector hosted by the source base station 306. The mobile device 304 can begin to detect additional base stations in proximity and can desire to request information from the base stations for subsequent handing-over thereto. Thus, the mobile device 304 can utilize the gap requestor 314 to request communication gaps with the source base station 306 over which the mobile device 304 expects to transmit and receive data from one or more disparate base stations, such as the target base station 302. During these gaps, in one example, the mobile device 304 can transmit an SRS to obtain information from the one or more base stations regarding timing and the like. It is to be appreciated that the gaps and request of such are not required; this is just one possible example of obtaining information from the target base station 302.

In one example, the target base station 302 can utilize the control resource assignor 308 to establish the schedule request UL channel with the target base station 302. Additionally, the mobile device 304 can transmit an SRS to the target base station 302, and the target information receiver 316 can obtain the transmitted information and continually monitor the target base station 302 to synchronize timing of the target base station 302. In one example, the target information receiver 316 can obtain a response to a transmitted SRS to determine information regarding a TA or other timing information. Additionally, the mobile device 304 can synchronize with the base station 302 based at least in part on the receiving information or resources to facilitate subsequent handing over. In another example, the network can be synchronized and maintaining uplink timing towards multiple base stations such that the cyclic prefix can accommodate timing difference due to difference in propagation time between the serving and target base stations. Additionally or alternatively, in a synchronous wireless network, the timing can be substantially the same for the target and source base stations such that timing detection is not needed. It is to be appreciated that this can occur on the one or more base stations such that the mobile device 304 can have an array of base station information that can be utilized to determine a most desirable base station for handing over communications. The base station chosen for handover can be based on a TA that is closest to the TA of the source base station 306, such that communications can be significantly synchronized for handover. In one example, the TA can be determined and compared by discerning a scrambling code for the resource sent by the target base station 302 and comparing that code to a scrambling code for the source base station 306.

As the mobile device 304 moves throughout the sector of the source base station 306, it can move into closer range of the target base station 302 and detect that handover to the target base station 302 would be beneficial. This can be based at least in part on signal strength, desired resources or services offered by the target base station 302, and/or the like. The target resource requestor 318 can transmit an initial handover message to the target base station 302 over the assigned schedule request resources using timing parameters (or TA) deduced from monitoring the target base station 302. Thus, RACH is not required for adjusting timing before requesting resources. It is to be appreciated, as mentioned, that additional mechanisms can be utilized (e.g., TTIs with strategically longer CPs, HARQ transmissions, and the like) with the initial handover message to account for minor timing error.

In one example, the target base station 302 can utilize different sized cyclic prefixes in given time intervals to compensate for greater error in timing of the initial handover transmission from the mobile device 304; this can be a network specification, specific to the target base station 302, etc. It is to be appreciated that information regarding the cyclic prefix size can be transmitted to mobile device 304 including broadcasting such (e.g., on a broadcast channel) and the like. For example, the information can be formatted such as a list of frames or TTIs having short and/or long cyclic prefixes. In another example, the information can comprise an offset from a current or initial frame to the first long cyclic prefix TTI. Additionally, the target base station 302 can dynamically configure the cyclic prefix specifically for the handover. Using this information, the mobile device 304 can handover to the target base station 302 and transmit initial data during a long cyclic prefix TTI to attain a greater possibility of successful communication (and therefore a successful handover). Once the initial communication is transmitted, the data resource scheduler 312 can schedule and return shared data channel access to the mobile device 304 to facilitate wireless communication service and complete handover from the source base station 306. At this point, the timing utilized for transmitting data to the target base station 302 can be more accurately synchronized.

Figure 4:
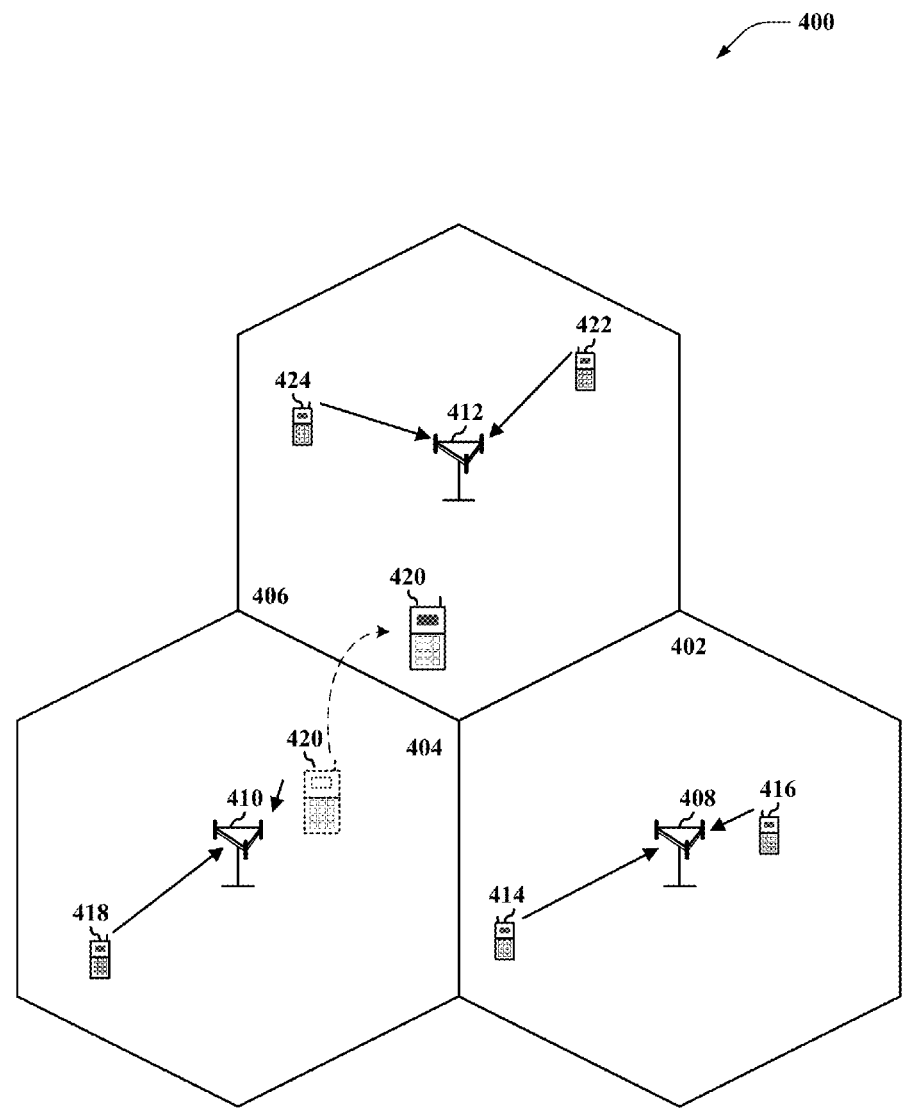
FIG. 4 is an illustration of an example wireless communications network with mobile devices moving between sectors.

Now referring to FIG. 4, an example multiple-access wireless communications network 400 is shown. The network 400 includes multiple communications cells 402, 404, and 406 each having a respective base station 408, 410, and 412 with multiple antennae to support communications from a variety of devices. For example, devices 414 and 416 in cell sector 402 can communicate with base station 408, devices 418 and 420 initially in sector 404 can communicate with base station 410, and devices 422 and 424 in sector 406 can communicate with base station 412. In this example, device 420 can be moving throughout the network 400. As the device 420 moves away from the base station 410, the signal can fade and resources required to communicate with the base station 410 can increase. As the device 420 moves toward base station 412, at some point it may be advantageous to communicate instead with base station 412 in sector 406; thus, the device 420 can be handed over from sector 404 to sector 406 (and hence from base station 410 to base station 412).

As described supra, the mobile device 420 can maintain and monitor a list of cells (e.g., cells 408 and 412) to which it can perform handover. For example, the mobile device 420 can initially transmit an SRS to the cells to obtain TA information and/or the like from the cells. In another example, this can be determined by analyzing a scrambling code for the cell 408 and/or 412 and comparing it to that of the current cell 410. In another example, the mobile device 420 can calculate a timing difference between the current cell 410 and cell 408 and/or 412 based at least in part on the monitored cell information received as part of the SRS. Additionally or alternatively, the mobile device 420 can maintain synchronized timing with the cells 408 and 412 over granted resources. When the mobile device 420 is sufficiently in range of the disparate cell, 412, it can transmit request for data resources over an assigned schedule request channel using the TA to adjust any timing difference. Though the timing may not be precise, in some examples, it can be generally close enough such that technologies can be utilized to appropriately decode the transmission. In one example, the base station 412 can utilize TTIs with extended cyclic prefixes, and the mobile device 420 can leverage these TTIs to transmit initial handover information.

However, extending cyclic prefixes can have an adverse affect on throughput; thus, only certain TTIs can have the extended cyclic prefixes in one example, and this information can be known by the mobile device 402 (e.g., by broadcasting information regarding the TTIs such as specific times of extended cyclic prefixes, a pattern with or without an offset, and/or specific occurrence) as described. In addition, TTIs having extended cyclic prefix can be specially (e.g., dynamically) implemented upon learning of the handover, in one example. Also, HARQ transmission can be used to improve the reliability of the initial (and/or subsequent) handover communications. It is to be appreciated that following initial communications, more precise timing information can be received and utilized by the mobile device 420 to ensure reliable subsequent communication with the base station 412. In this regard, handover is effectuated without using a RACH.

Figure 5:
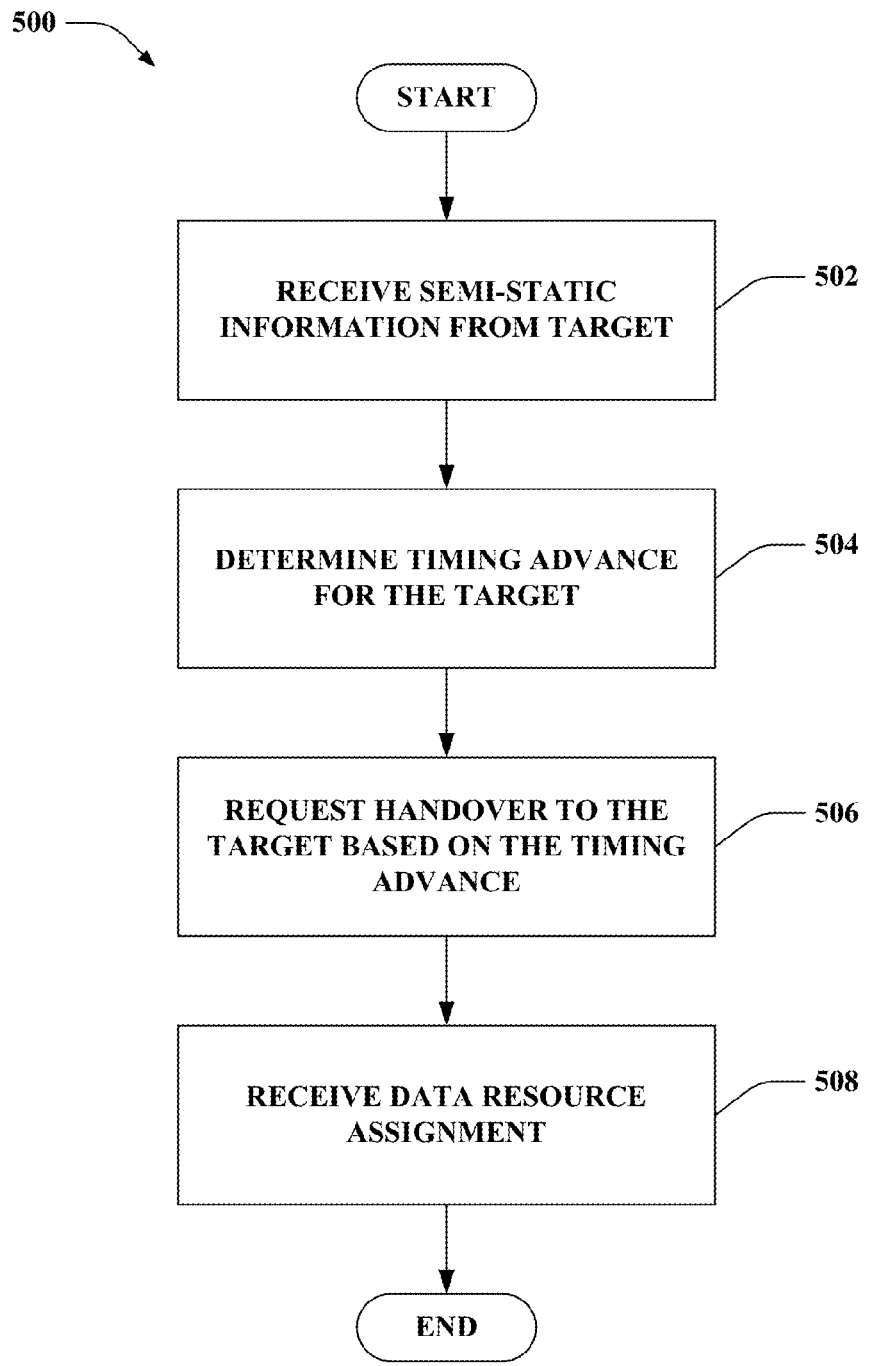
FIG. 5 is an illustration of an example methodology that facilitates requesting handover based on target resources.
Figure 6:
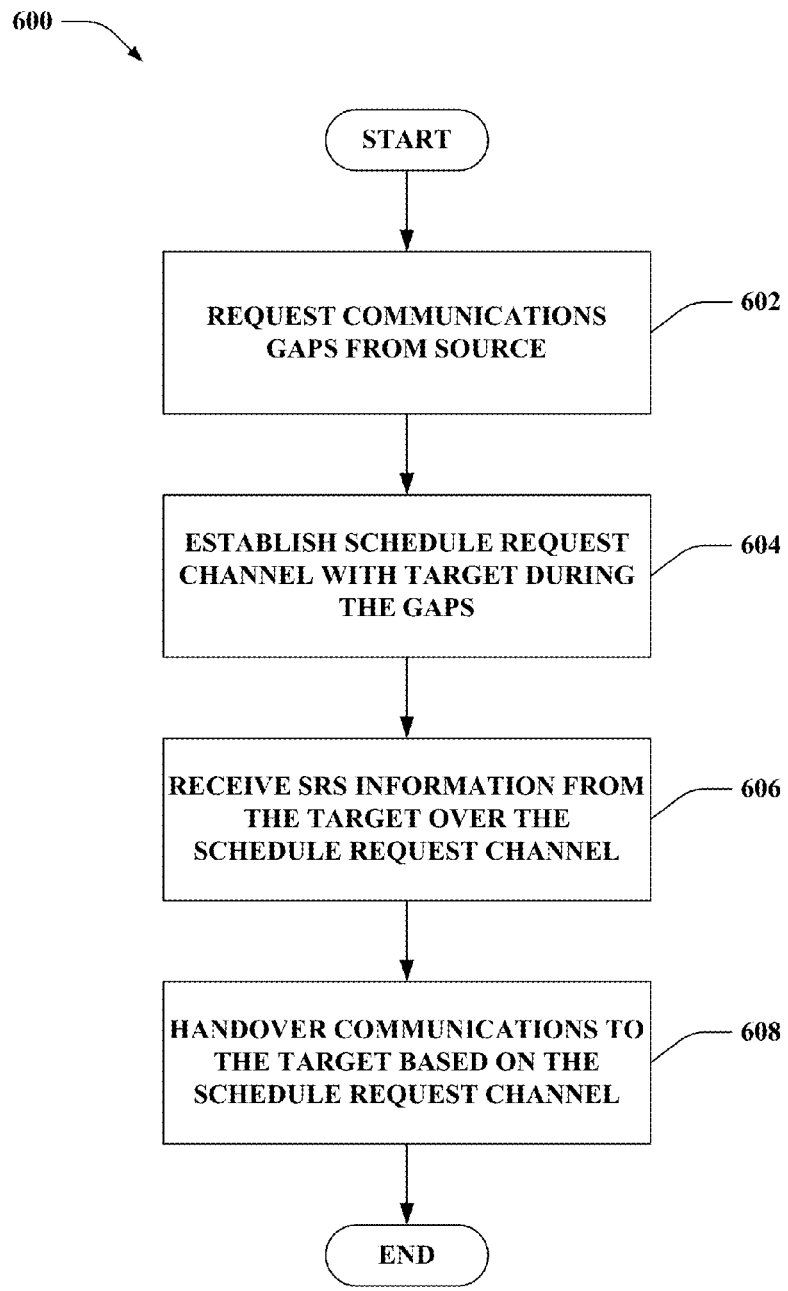
FIG. 6 is an illustration of an example methodology that facilitates requesting communications gaps from a source base station.

Referring to FIGS. 5-6, methodologies relating to handing over communications by monitoring resources of a target (e.g., instead of a RACH) are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates requesting handover via a time synchronized request based on received target resources or other information. At 502, semi-static information is received from the target. For example, this can relate to a response from transmitting an SRS that can be analyzed to determine a TA or difference between TA of target and source as described above. The information can additionally or alternatively include C-RNTI; using this information, connected entry into a cell related to the target can occur. At 504, the TA is determined for the target as mentioned. The TA can help synchronize communications with the target by comparing the TA of the target to that of the source, or calculating a distance therebetween and using the difference to synchronize an initial handover message.

At 506, handover can be requested to the target based on the TA. This can be done using the aforementioned mechanisms to determine a timing difference or choosing a target that has a similar TA as the source. In addition, as the comparison or calculation may not produce a completely accurate synchronization with the target, measures can be taken to increase likelihood of successful communication. This includes using TTIs with longer cyclic prefixes, HARQ transmissions, etc., as described supra. The handover or scheduling request can be transmitted over an assigned schedule request channel or other control channels related to the target base station, in one example. At 508, the data resource assignment is received allowing communications services to transpire with the target. It is to be appreciated that once this assignment is received, more accurate timing information is received such to allow synchronized communication with the target.

Now referring to FIG. 6, a methodology 600 that facilitates handing over communications between a source and target access point using target resources acquired before the handover is illustrated. At 602, communication gaps are requested from a source. For example, when communicating with the source, gaps can be requested so that no communication with the source will occur in the gap. At 604, a schedule request channel can be established with a target during the gaps. Thus, as communication is not taking place with the source, the target can be contacted for establishing the channel. In one example, a sounding reference signal can be sent, in a gap, to the target to establish the schedule request channel during the gaps.

At 606, SRS information can be received on the target base station. In response, the target base stations can provide TA to the UE over the air and/or via the source base station, etc. As mentioned, the SRS information can be utilized to determine a TA difference or comparison of the target with the source, etc. Additionally, C-RNTI can be received such that having the C-RNTI and timing of the target, communications can be initially handed over without using a RACH at 608. It is to be appreciated that once handover occurs, more accurate timing information can be received.

It will be appreciated that, in accordance with one or more aspects described herein, inferences can be made regarding handing over communications from a source base station to a target base station for a mobile device as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to from which devices to request semi-static data, determining communications gaps to request from a source base station, choosing a target base station for handing over communications, etc. Inferences can also be made pertaining to calculating the timing difference between a source and target base station, as well as determining a TTI using extended cyclic prefixes to strategically transmit initial handover data within, and/or the like.

Figure 7:
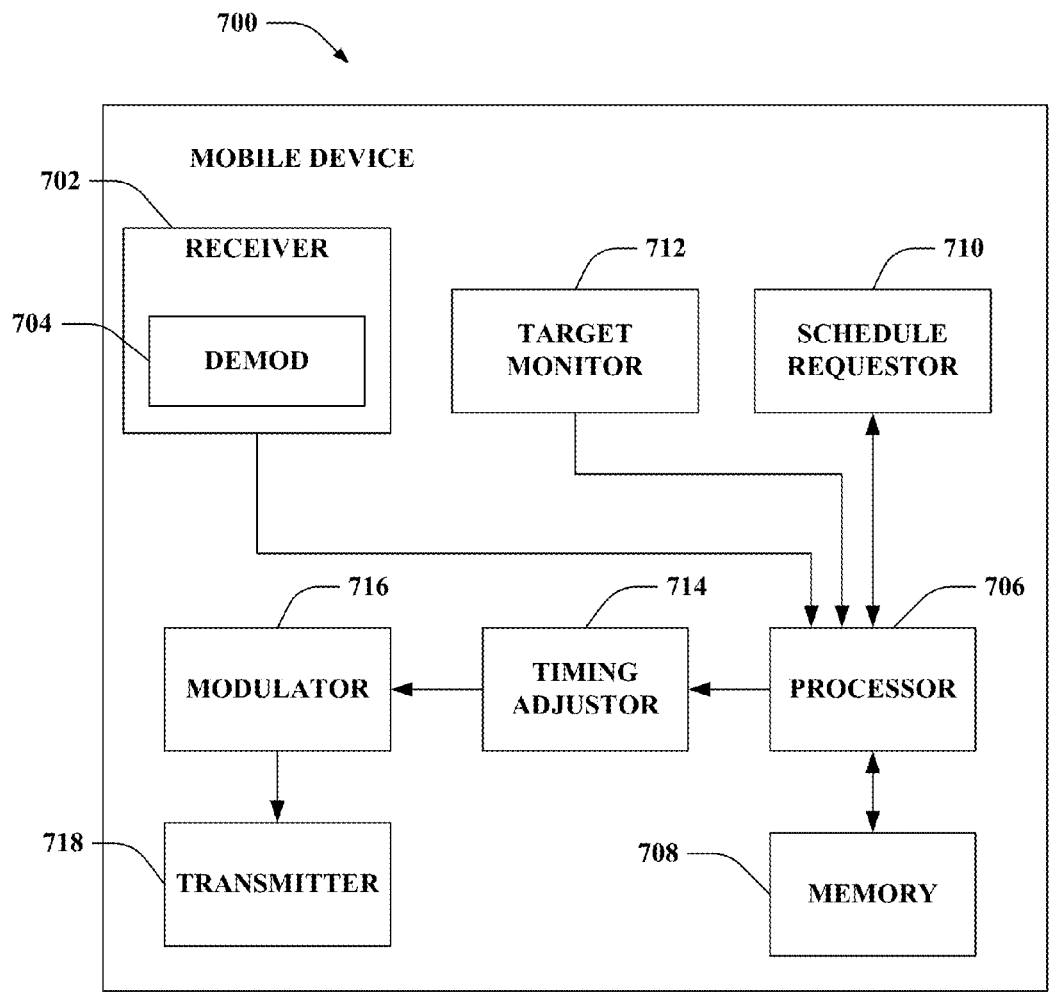
FIG. 7 is an illustration of an example mobile device that facilitates requesting scheduling with a target base station to facilitate handover.

FIG. 7 is an illustration of a mobile device 700 that facilitates handing over communications utilizing requested information from a target to transmit initial handover data. Mobile device 700 comprises a receiver 702 that receives a signal from, for instance, a receive antenna (not shown), performs typical actions on (e.g., filters, amplifies, down-converts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 718, a processor that controls one or more components of mobile device 700, and/or a processor that both analyzes information received by receiver 702, generates information for transmission by transmitter 718, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a schedule requestor 710 that can request scheduling resources from a target base station as well as a target monitor 712 that can evaluate communication with one or more targets to ensure correct timing, etc. In one example, the mobile device can move throughout a service area and evaluate base stations for handing over communications. This can begin by using the schedule requestor 710 to establish an uplink schedule request channel with the base station over which the mobile device 700 can receive grants for resources, such as CQI resources, resources for data transmission and reception, etc. In one example, the mobile device 700 can transmit a SRS to obtain a TA for a target base station, which can be subsequently utilized to request data resources over the scheduling request channel; additionally, the mobile device 700 request communication gaps from a source base station over which to sound the signal and receive establishment. The target monitor 712 can continually monitor the schedule request channel and/or resources received in relation to the channel to have current timing information for the target base station(s).

When the mobile device 700 determines handover to the disparate base station would be beneficial (e.g., when a related signal reaches a given threshold), in one example, a target can be chosen from the target monitor 712 based at least in part on a timing difference between the current source base station and the target. Additionally, a timing adjuster 714 coupled to the processor 706 can be utilized to determine a generally correct timing for the target base station based at least in part on a difference in time between the source and target base stations (e.g., by evaluating their respective synchronization channels or scrambling codes). The timing adjustor 714 can utilized the determined adjustment to transmit an initial handover message. It is to be appreciated that, as described previously, measures can be taken at both ends to strengthen reliability of the initial communication so more precise timing information can eventually be received. Mobile device 700 still further comprises a modulator 716 and transmitter 718 that respectively modulate and transmit signals to, for instance, a base station, another mobile device, etc. Although depicted as being separate from the processor 706, it is to be appreciated that the schedule requestor 710, target monitor 712, timing adjustor 714, demodulator 704, and/or modulator 716 can be part of the processor 706 or multiple processors (not shown).

Figure 8:
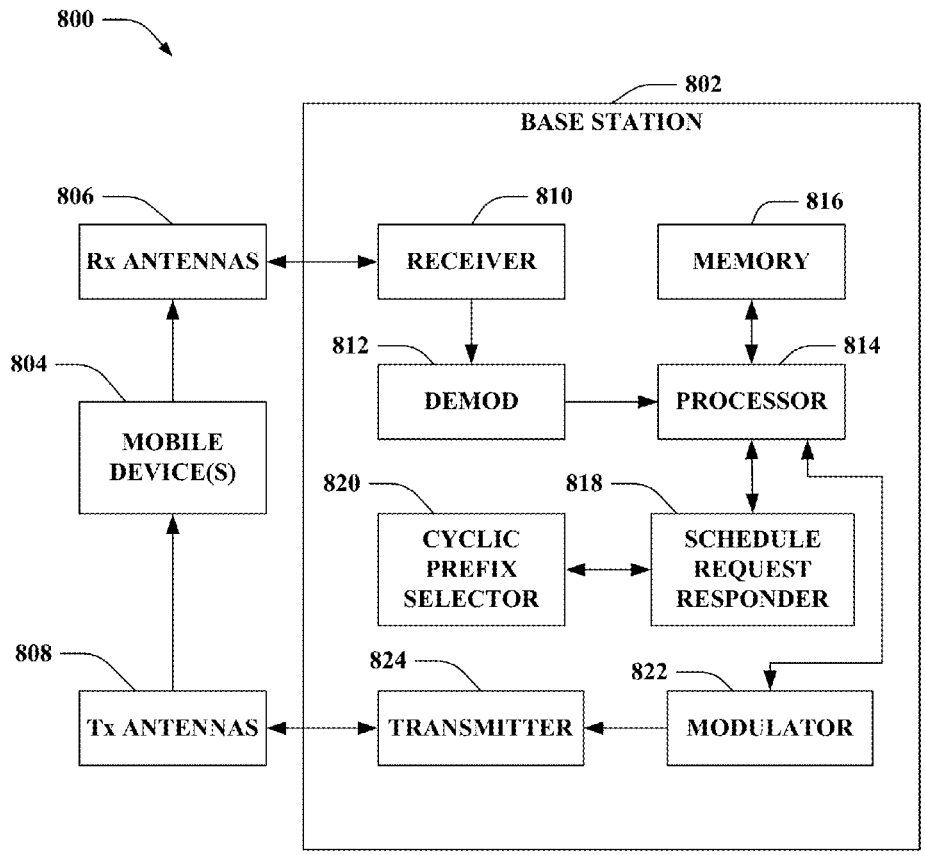
FIG. 8 is an illustration of an example system that facilitates providing resources for handing over communications.

FIG. 8 is an illustration of a system 800 that facilitates granting resources and extended CP TTIs for mobile device handover. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a schedule request responder 818 that can establish a schedule request channel with one or more mobile devices 804 for possible subsequent handover and a cyclic prefix selector 820 that can specify longer CPs for certain TTIs to facilitate accounting for minor timing errors during handover.

For instance, one or more mobile devices 804 can be in range for handover and can request establishment of an uplink schedule request channel. The schedule request responder 818 can establish the channel with the mobile device 804. The mobile device 804 can additionally transmit SRSs to the base station 802, and the base station 802 can transmit information regarding certain resources (e.g., TA, C-RNTI, etc.) over the channel. In addition, the cyclic prefix selector 820 can establish one or more TTIs to have longer CP to account for timing error in an initial handover communication from the mobile device 804 based on the schedule request channel and/or information received over the channel. For example, the cyclic prefix selector 820 can specify longer CP for periodic TTIs, requested TTIs, inferred TTIs based on a likelihood of handover, for example, and/or the like. Furthermore, although depicted as being separate from the processor 814, it is to be appreciated that the schedule request responder 818, cyclic prefix selector 820, demodulator 812, and/or modulator 822 can be part of the processor 814 or multiple processors (not shown).

Figure 9:
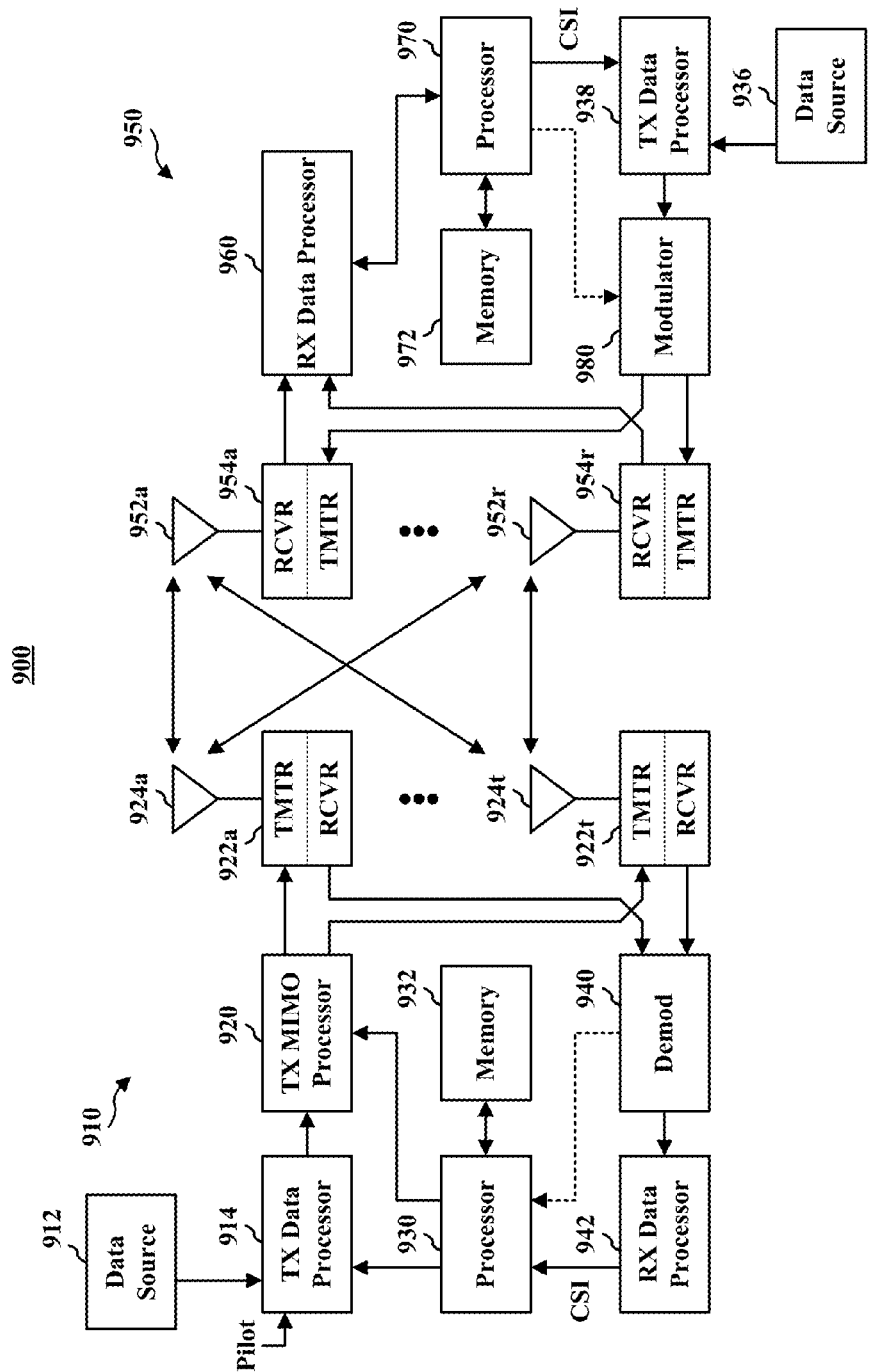
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 7-8) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
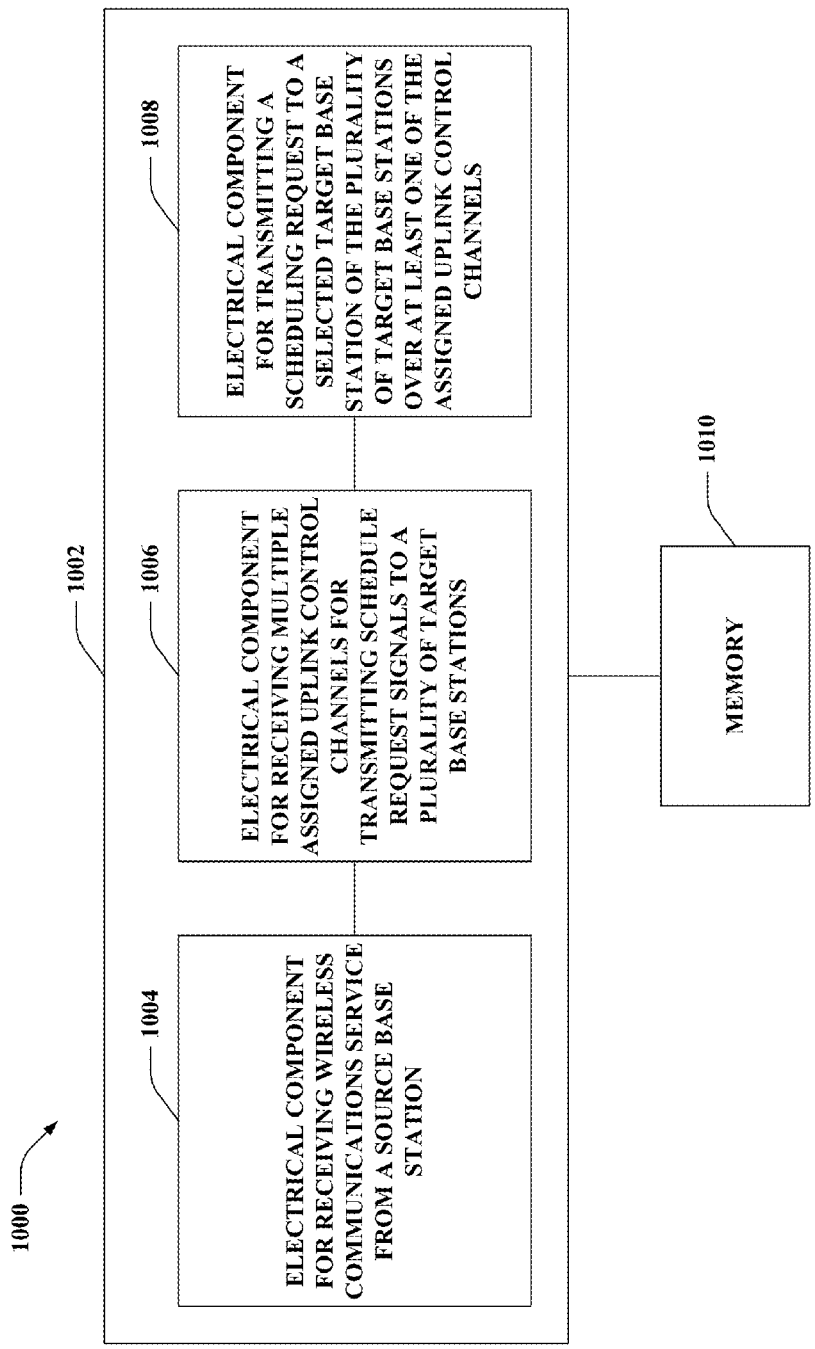
FIG. 10 is an illustration of an example system that monitors target communications resources for handing over mobile device communications.

With reference to FIG. 10, illustrated is a system 1000 that facilitates handing over mobile communications in a wireless network without using a RACH. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving wireless communications service from a source base station 1004. For example, the system 1000 can communicate with the base station over one or more channels, as described above, to effectuate wireless communication service. Further, logical grouping 1002 can comprise an electrical component for receiving multiple assigned uplink control channels for transmitting schedule request signals to a plurality of target base stations 1006. For example, the resources can relate to handing over communications to the target base station. Additionally, other resources of the target base station can be monitored by transmitting SRS or determining TA information for the target base station, for example. Moreover, logical grouping 1002 can comprise an electrical component for transmitting a scheduling request to a selected target base station of the plurality of target base stations over at least one of the assigned uplink control channels 1008. For example, the TA of the target base station can be utilized in transmitting the scheduling request for more efficient handover. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for handing over communications in a wireless network, comprising:
   receiving wireless communications service from a source base station;
   receiving one or more assigned uplink control channels for transmitting schedule request signals to a plurality of target base stations;
   transmitting a sounding reference signal (SRS) to at least one of the plurality of target base stations using at least one of the assigned uplink control channels;
   receiving, from the at least one of the plurality of target base stations, a response to the SRS;
   determining timing advance (TA) information from the received response to the SRS, wherein determining the TA information comprises:
   comparing timing information associated with the at least one of the target base stations with timing information associated with the source base station; and
   determining the TA information based on a difference between the timing information associated with the at least one of the target base stations and the timing information associated with the source base station;
   selecting, based on the determined TA information, a base station of the plurality of target base stations to perform handover to; and
   transmitting a scheduling request to the selected base station over at least one of the assigned uplink control channels using the determined TA information.

2. The method of claim 1, further comprising:
   maintaining synchronization with the one or more assigned uplink control channels using the TA information to facilitate subsequent handover of communications to the selected base station.

3. The method of claim 2, wherein the scheduling request is transmitted to the selected base station based, at least in part, on a timing difference between the selected base station and the source base station.

4. The method of claim 1, wherein the source base station and the selected base station are synchronized in time and wherein source base station timing is used to transmit the scheduling request.

5. The method of claim 1, further comprising selecting a transmission time interval (TTI) having a longer cyclic prefix with respect to the selected base station for transmitting a handover communication to the selected base station.

6. The method of claim 1, further comprising receiving wireless communication service from the selected base station following transmission of an initial handover communication.

7. An apparatus for wireless communications, comprising:
   at least one processor configured to:
   receive wireless communications service from a source base station;
   receive one or more assigned uplink control channels for transmitting schedule request signals to a plurality of target base stations;
   transmit a sounding reference signal (SRS) to at least one of the plurality of target base stations using at least one of the assigned uplink control channels;
   receive, from the at least one of the plurality of target base stations, a response to the SRS;
   determine timing advance (TA) information from the received response to the SRS, wherein the at least one processor is configured to determine the TA information comprises:
   comparing timing information associated with the at least one of the target base stations with timing information associated with the source base station; and
   determining the TA information based on a difference between the timing information associated with the at least one of the target base stations and the timing information associated with the source base station;
   select, based on the determined TA information, a base station of the plurality of target base stations to perform handover to; and transmit a scheduling request to the selected base station over at least one of the assigned uplink control channels using the determined TA information; and a memory coupled to the at least one processor.

8. The apparatus of claim 7, wherein the at least one processor is further configured to:

maintain synchronization with the one or more assigned uplink control channels using the TA information to facilitate subsequent handover of communications to the selected base station.

9. The apparatus of claim 8, wherein the scheduling request is transmitted to the selected base station based, at least in part, on a timing difference between the selected base station and the source base station.

10. The apparatus of claim 7, wherein the source base station and the selected base station are synchronized in time, and wherein source base station timing is used to transmit the scheduling request.

11. The apparatus of claim 7, wherein the at least one processor is further configured to:

select a transmission time interval (TTI) having a longer cyclic prefix with respect to the selected base station for transmitting a handover communication to the selected base station.

12. The apparatus of claim 7, wherein the at least one processor is further configured to:

receive wireless communication service from the selected base station following transmission of an initial handover communication.

13. An apparatus for wireless communications, comprising:

means for receiving wireless communications service from a source base station;

means for receiving one or more assigned uplink control channels for transmitting schedule request signals to a plurality of target base stations;

means for transmitting a sounding reference signal (SRS) to at least one of the plurality of target base stations using at least one of the assigned uplink control channels;

means for receiving, from the at least one of the plurality of target base stations, a response to the SRS;

means for determining timing advance (TA) information from the received response to the SRS, wherein determining the TA information comprises:

comparing timing information associated with the at least one of the target base stations with timing information associated with the source base station; and determining the TA information based on a difference between the timing information associated with the at least one of the target base stations and the the timing information associated with the source base station;

means for selecting, based on the determined TA information, a base station of the plurality of target base stations to perform handover to; and means for transmitting a scheduling request to the selected base station over at least one of the assigned uplink control channels using the determined TA information.

14. The apparatus of claim 13, further comprising:

means for maintaining synchronization with the one or more assigned uplink control channels using the TA information to facilitate subsequent handover of communications to the selected base station.

15. The apparatus of claim 14, wherein the scheduling request is transmitted to the selected base station based, at least in part, on a timing difference between the selected base station and the source base station.

16. The apparatus of claim 13, wherein the source base station and the selected base station are synchronized in time and wherein source base station timing is used to transmit the scheduling request.

17. The apparatus of claim 13, further comprising means for selecting a transmission time interval (TTI) having a longer cyclic prefix with respect to the selected base station for transmitting a handover communication to the selected base station.

18. The apparatus of claim 13, further comprising means for receiving wireless communication service from the selected base station following transmission of an initial handover communication.

19. A non-transitory computer-readable medium comprising instructions which, when executed by one or more processors, performs an operation for handing over communications in a wireless network, the operation comprising:

receiving wireless communications service from a source base station;

receiving one or more assigned uplink control channels for transmitting schedule request signals to a plurality of target base stations;

transmitting a sounding reference signal (SRS) to at least one of the plurality of target base stations using at least one of the assigned uplink control channels;

receiving, from the at least one of the plurality of target base stations, a response to the SRS;

determining timing advance (TA) information from the received response to the SRS, wherein determining the TA information comprises:

comparing timing information associated with the at least one of the target base stations with timing information associated with the source base station; and determining the TA information based on a difference between the timing information associated with the at least one of the target base stations and the timing information associated with the source base station;

selecting, based on the determined TA information, a base station of the plurality of target base stations to perform handover to; and transmitting a scheduling request to the selected base station over at least one of the assigned uplink control channels using the determined TA information.

* * * * *